US009017157B2

(12) United States Patent
Wells et al.

(10) Patent No.: US 9,017,157 B2
(45) **Date of Patent: *Apr. 28, 2015**

(54) WIDE SCREEN GAMING APPARATUS

(75) Inventors: William Wells, Reno, NV (US); Chan Griswold, Reno, NV (US)

(73) Assignee: IGT, Las Vegas, NV (US)

( * ) Notice: Subject to any disclaimer, the term of this patent is extended or adjusted under 35 U.S.C. 154(b) by 931 days.

This patent is subject to a terminal disclaimer.

(21) Appl. No.: 13/207,385

(22) Filed: Aug. 10, 2011

(65) Prior Publication Data

US 2012/0034976 A1 Feb. 9, 2012

Related U.S. Application Data

(63) Continuation of application No. 11/377,070, filed on Mar. 16, 2006, now Pat. No. 8,033,902, which is a continuation of application No. 09/967,348, filed on Sep. 28, 2001, now abandoned.

(51) Int. Cl.
*A63F 9/24* (2006.01)
*G06F 17/00* (2006.01)
*G07F 17/32* (2006.01)

(52) U.S. Cl.
CPC .................................. *G07F 17/3211* (2013.01)

(58) Field of Classification Search
None
See application file for complete search history.

(56) References Cited

U.S. PATENT DOCUMENTS 2,604,536 A 7/1952 Rose
2,890,010 A 6/1959 Barkheimer
3,825,905 A 7/1974 Allen
3,838,264 A 9/1974 Maker
4,200,770 A 4/1980 Hellman et al.
4,218,582 A 8/1980 Hellman et al.
4,267,560 A 5/1981 Ishikawa et al.
4,354,251 A 10/1982 Hellwig et al.
4,405,829 A 9/1983 Rivest et al.
4,467,424 A 8/1984 Hedges et al.
4,630,821 A 12/1986 Greenwald
4,705,274 A 11/1987 Lubeck (Continued)

FOREIGN PATENT DOCUMENTS

AU 199952687 A1 4/2000
EP 1 000 642 5/2000

(Continued)

OTHER PUBLICATIONS

U.S. Appl. No. 13/207,385, filed Aug. 10, 2011, Wells et al.

(Continued)

*Primary Examiner* — Paul A D'Agostino
(74) *Attorney, Agent, or Firm* — Neal, Gerber & Eisenberg LLP

(57) ABSTRACT

A gaming apparatus includes a display unit and has a display support structure that extends substantially vertically from a horizontal support base. The display unit includes a flat-panel display screen having a width (W) and a height (H) wherein W/His at least 16/10 The display unit is rotatable about a horizontal axis located in a plane substantially parallel to the display screen wherein, a player's angle of viewing the display unit may be adjusted by vertical translation of the display unit on the display support structure, over a vertical range of motion, and by rotation of the display unit about the horizontal axis. A front face of the display structure presents, in a region proximate to the vertical range of motion, a concave side of a curved surface.

6 Claims, 16 Drawing Sheets

(56) References Cited

U.S. PATENT DOCUMENTS

| | | | | | |
|---|---|---|---|---|---|
| 4,710,129 | A | | 12/1987 | Newman et al. | |
| 4,727,544 | A | | 2/1988 | Brunner et al. | |
| 4,752,068 | A | | 6/1988 | Endo | |
| 4,759,064 | A | | 7/1988 | Chaum | |
| 4,826,245 | A | | 5/1989 | Entratter | |
| 4,837,728 | A | | 6/1989 | Barrie et al. | |
| 4,845,715 | A | | 7/1989 | Francisco | |
| 4,848,744 | A | | 7/1989 | Steininger et al. | |
| 4,856,787 | A | * | 8/1989 | Itkis | 273/237 |
| 4,865,321 | A | | 9/1989 | Nakagawa et al. | |
| 4,911,449 | A | | 3/1990 | Dickinson et al. | |
| 4,926,327 | A | | 5/1990 | Sidley | |
| 4,930,073 | A | | 5/1990 | Cina, Jr. | |
| 4,951,149 | A | | 8/1990 | Faroudja | |
| 5,004,232 | A | | 4/1991 | Wong et al. | |
| 5,021,772 | A | | 6/1991 | King et al. | |
| 5,054,771 | A | | 10/1991 | Mansfield | |
| 5,105,184 | A | * | 4/1992 | Pirani et al. | 345/629 |
| 5,146,335 | A | | 9/1992 | Kim et al. | |
| 5,168,362 | A | | 12/1992 | Yoshida | |
| 5,195,746 | A | | 3/1993 | Boyd et al. | |
| 5,232,191 | A | | 8/1993 | Infanti | |
| 5,235,642 | A | | 8/1993 | Wobber et al. | |
| 5,259,613 | A | | 11/1993 | Marnell | |
| 5,267,775 | A | | 12/1993 | Nguyen | |
| 5,277,392 | A | | 1/1994 | Rossman et al. | |
| 5,277,424 | A | | 1/1994 | Wilms | |
| D344,505 | S | | 2/1994 | Traldi | |
| 5,283,734 | A | | 2/1994 | Von Kohorn | |
| 5,288,978 | A | | 2/1994 | Lijima | |
| 5,291,585 | A | | 3/1994 | Sato et al. | |
| 5,326,104 | A | | 7/1994 | Pease et al. | |
| 5,332,219 | A | | 7/1994 | Marnell et al. | |
| 5,342,047 | A | | 8/1994 | Heidel et al. | |
| 5,343,527 | A | | 8/1994 | Moore | |
| 5,373,440 | A | * | 12/1994 | Cohen et al. | 705/14.12 |
| 5,434,625 | A | | 7/1995 | Willis | |
| 5,442,406 | A | | 8/1995 | Altmanshofer et al. | |
| 5,465,364 | A | | 11/1995 | Lathrop et al. | |
| 5,488,702 | A | | 1/1996 | Byers et al. | |
| 5,489,095 | A | | 2/1996 | Goudard et al. | |
| 5,521,631 | A | * | 5/1996 | Budow et al. | 725/78 |
| 5,573,320 | A | | 11/1996 | Shearer | |
| 5,577,266 | A | * | 11/1996 | Takahisa et al. | 455/3.06 |
| 5,584,763 | A | | 12/1996 | Kelly et al. | |
| 5,586,766 | A | | 12/1996 | Forte et al. | |
| 5,588,649 | A | * | 12/1996 | Blumberg et al. | 463/18 |
| D378,224 | S | | 2/1997 | Brettschneider | |
| 5,604,801 | A | | 2/1997 | Dolan et al. | |
| D378,534 | S | | 3/1997 | Kato et al. | |
| D378,604 | S | | 3/1997 | Brettschneider | |
| D378,929 | S | | 4/1997 | Brettschneider | |
| D381,697 | S | | 7/1997 | Brettschneider | |
| D381,698 | S | | 7/1997 | Brettschneider | |
| D381,699 | S | | 7/1997 | Brettschneider | |
| D381,700 | S | | 7/1997 | Brettschneider | |
| 5,643,086 | A | | 7/1997 | Alcorn et al. | |
| 5,643,088 | A | * | 7/1997 | Vaughn et al. | 463/40 |
| 5,644,704 | A | | 7/1997 | Pease et al. | |
| 5,655,965 | A | | 8/1997 | Takemoto et al. | |
| 5,655,966 | A | | 8/1997 | Werdin et al. | |
| 5,667,179 | A | | 9/1997 | Rosen | |
| 5,678,886 | A | | 10/1997 | Infanti | |
| 5,704,835 | A | | 1/1998 | Dietz | |
| 5,708,845 | A | * | 1/1998 | Wistendahl et al. | 715/202 |
| 5,717,923 | A | * | 2/1998 | Dedrick | 1/1 |
| 5,725,428 | A | | 3/1998 | Achmüller | |
| 5,737,418 | A | | 4/1998 | Saffari et al. | |
| D395,463 | S | | 6/1998 | Scott et al. | |
| 5,762,617 | A | | 6/1998 | Infanti | |
| 5,779,547 | A | | 7/1998 | SoRelle et al. | |
| 5,781,894 | A | * | 7/1998 | Petrecca et al. | 705/14.4 |
| 5,791,988 | A | | 8/1998 | Nomi | |
| 5,800,264 | A | | 9/1998 | Pascal et al. | |
| 5,807,177 | A | | 9/1998 | Takemoto et al. | |
| 5,830,065 | A | | 11/1998 | Sitrick | |
| 5,846,134 | A | | 12/1998 | Latypov | |
| 5,854,735 | A | | 12/1998 | Cheng | |
| 5,890,962 | A | | 4/1999 | Takemoto | |
| 5,913,040 | A | * | 6/1999 | Rakavy et al. | 709/232 |
| 5,917,725 | A | * | 6/1999 | Thacher et al. | 700/91 |
| 5,918,841 | A | | 7/1999 | Sweere et al. | |
| 5,934,672 | A | | 8/1999 | Sines et al. | |
| 5,948,061 | A | * | 9/1999 | Merriman et al. | 709/219 |
| 5,949,643 | A | | 9/1999 | Batio | |
| 5,951,397 | A | | 9/1999 | Dickinson | |
| 5,986,224 | A | | 11/1999 | Kent | |
| 5,993,316 | A | | 11/1999 | Coyle et al. | |
| D417,893 | S | | 12/1999 | Hunter et al. | |
| 6,004,208 | A | | 12/1999 | Takemoto et al. | |
| 6,005,641 | A | | 12/1999 | Ui | |
| 6,061,104 | A | | 5/2000 | Evanicky et al. | |
| 6,068,552 | A | | 5/2000 | Walker et al. | |
| 6,089,663 | A | | 7/2000 | Hill | |
| 6,095,476 | A | | 8/2000 | Mathis | |
| 6,098,985 | A | | 8/2000 | Moody | |
| 6,102,476 | A | | 8/2000 | May et al. | |
| 6,104,815 | A | | 8/2000 | Alcom et al. | |
| 6,106,396 | A | | 8/2000 | Alcorn et al. | |
| 6,119,098 | A | * | 9/2000 | Guyot et al. | 705/14.61 |
| 6,125,028 | A | | 9/2000 | Matsumoto | |
| 6,132,311 | A | | 10/2000 | Williams | |
| 6,134,103 | A | | 10/2000 | Ghanma | |
| 6,135,884 | A | | 10/2000 | Hedrick et al. | |
| 6,135,885 | A | | 10/2000 | Lermusiaux | |
| 6,146,271 | A | | 11/2000 | Kadlic | |
| 6,148,242 | A | | 11/2000 | Descalzi et al. | |
| 6,149,522 | A | | 11/2000 | Alcorn et al. | |
| 6,164,645 | A | | 12/2000 | Weiss | |
| 6,169,568 | B1 | | 1/2001 | Shigetomi | |
| 6,177,887 | B1 | | 1/2001 | Jerome | |
| 6,189,849 | B1 | | 2/2001 | Sweere et al. | |
| 6,190,255 | B1 | | 2/2001 | Thomas et al. | |
| 6,206,782 | B1 | | 3/2001 | Walker et al. | |
| 6,210,279 | B1 | | 4/2001 | Dickinson | |
| 6,216,989 | B1 | | 4/2001 | Shioya et al. | |
| 6,220,959 | B1 | | 4/2001 | Holmes et al. | |
| 6,251,014 | B1 | | 6/2001 | Stockdale et al. | |
| 6,252,590 | B1 | | 6/2001 | Sawai et al. | |
| 6,270,410 | B1 | | 8/2001 | De Mar et al. | |
| 6,302,790 | B1 | | 10/2001 | Brossard | |
| 6,315,666 | B1 | | 11/2001 | Mastera et al. | |
| 6,322,445 | B1 | | 11/2001 | Miller | |
| 6,334,612 | B1 | | 1/2002 | Wurz et al. | |
| 6,347,999 | B1 | | 2/2002 | Yuan | |
| 6,381,125 | B1 | | 4/2002 | Mizoguchi et al. | |
| 6,394,402 | B2 | | 5/2002 | Coonan et al. | |
| 6,443,837 | B1 | | 9/2002 | Jaffe et al. | |
| 6,475,087 | B1 | | 11/2002 | Cole | |
| 6,480,243 | B2 | | 11/2002 | Yamamoto | |
| 6,486,900 | B1 | | 11/2002 | Shen et al. | |
| 6,503,146 | B2 | | 1/2003 | Walker et al. | |
| 6,520,856 | B1 | | 2/2003 | Walker et al. | |
| 6,530,842 | B1 | | 3/2003 | Wells et al. | |
| 6,533,273 | B2 | | 3/2003 | Cole et al. | |
| 6,561,898 | B2 | | 5/2003 | Moody | |
| 6,585,587 | B2 | | 7/2003 | Falciglia | |
| 6,620,047 | B1 | | 9/2003 | Alcorn et al. | |
| 6,633,850 | B1 | * | 10/2003 | Gabbard et al. | 705/14.66 |
| 6,645,072 | B1 | | 11/2003 | Kellen | |
| 6,654,068 | B1 | | 11/2003 | Brewington et al. | |
| 6,669,198 | B2 | | 12/2003 | Wichinsky | |
| 6,688,984 | B2 | | 2/2004 | Cole | |
| 6,708,975 | B1 | | 3/2004 | Fox et al. | |
| 6,910,734 | B2 | | 6/2005 | Steelman | |
| 6,994,306 | B1 | | 2/2006 | Sweere et al. | |
| 7,072,849 | B1 | * | 7/2006 | Filepp et al. | 705/14.66 |
| 7,261,261 | B2 | | 8/2007 | Ligertwood | |
| D587,256 | S | | 2/2009 | Morello | |
| 2002/0160825 | A1 | | 10/2002 | Nicastro et al. | |
| 2002/0183105 | A1 | | 12/2002 | Cannon et al. | |
| 2003/0060270 | A1 | | 3/2003 | Binkley et al. | |

(56) References Cited

U.S. PATENT DOCUMENTS

| | | | |
|---|---|---|---|
| 2003/0064784 | A1 | 4/2003 | Wells et al. |
| 2003/0069070 | A1 | 4/2003 | Alcorn et al. |
| 2006/0160598 | A1 | 7/2006 | Wells et al. |

FOREIGN PATENT DOCUMENTS

| | | |
|---|---|---|
| EP | 1 011 124 | 6/2000 |
| JP | 1015243 | 1/1998 |
| JP | 11122564 | 4/1999 |
| JP | 200187554 | 4/2001 |
| WO | WO 98/00207 | 1/1998 |
| WO | WO 00/79467 | 12/2000 |
| WO | WO 02/099760 | 12/2002 |

OTHER PUBLICATIONS

US Office Action dated Apr. 17, 2003 issued in U.S. Appl. No. 09/967,348.
US Office Action dated Dec. 15, 2003 issued in U.S. Appl. No. 09/967,348.
US Office Action dated Aug. 23, 2004 issued in U.S. Appl. No. 09/967,348.
US Office Action dated Mar. 14, 2005 issued in U.S. Appl. No. 09/967,348.
US Office Action Final dated Sep. 16, 2005 issued in U.S. Appl. No. 09/967,348.
US Office Action dated Nov. 2, 2006 issued in U.S. Appl. No. 11/377,070.
US Examiner Interview Summary dated Apr. 3, 2007 issued in U.S. Appl. No. 11/377,070.
US Office Action Final dated Jul. 19, 2007 issued in U.S. Appl. No. 11/377,070.
US Office Action dated May 9, 2008 issued in U.S. Appl. No. 11/377,070.
US Office Action dated Jan. 26, 2009 issued in U.S. Appl. No. 11/377,070.
US Office Action Final dated Nov. 19, 2009 issued in U.S. Appl. No. 11/377,070.
US Office Action Final dated Jul. 14, 2010 issued in U.S. Appl. No. 11/377,070.
US Office Action dated Jan. 25, 2011 issued in U.S. Appl. No. 11/377,070.
US Examiner Interview Summary dated Apr. 7, 2011 issued in U.S. Appl. No. 11/377,070.
US Notice of Allowance dated Jul. 18, 2011 issued in U.S. Appl. No. 11/377,070.
Australian Examiner's first report dated Sep. 22, 2005 issued in AU 29239/02.
Australian Notice of Opposition; Statement of Grounds and Particulars dated Jul. 11, 2007 issued in AU 29239/02.
Australian Amended Statement of Grounds and Particulars dated Oct. 11, 2007 issued in AU 29239/02.
Barker, Garry, "G4 way ahead in the multimedia stakes-IT2-USERS-THE MAC MAN Age", The (Melbourne, Australia), NewsBank Inc, Access World News, (Tuesday,Sep. 7, 1999), 2 pages.
Article in Las Vegas Sunday, Apr. 7, 2000 entitled "High-definition TV debuts in Las Vegas", (Apr. 7, 2000), 4 pages, [online] [Retrieved on Sep. 1, 2011] at: http://www.lasvegassun.com/news/2000/apr/07/high-definition-tv-debuts-in-las-vegas/.
Casino Journal of Nevada, Oct. 1996, pp. 64-66, 68-76, 78, 82, 84, 86, 88, 90, 92, 94, 96, 98, 145, and 146.
"Digital Television and DVDS Drive Widescreen Sales", *Digital Broadcasting Australia News Release*, May 29, 2001: www.dba.org.au (May 29, 2001), 2 pages.
Levinthal, A., et al, "The Silicon Gaming Odyssey Slot Machine," IEEE published Feb. 23, 1997, pp. 296-301. Proceedings of COMCON 97, Feb. 23-26, 1997.

* cited by examiner

FIG. 12
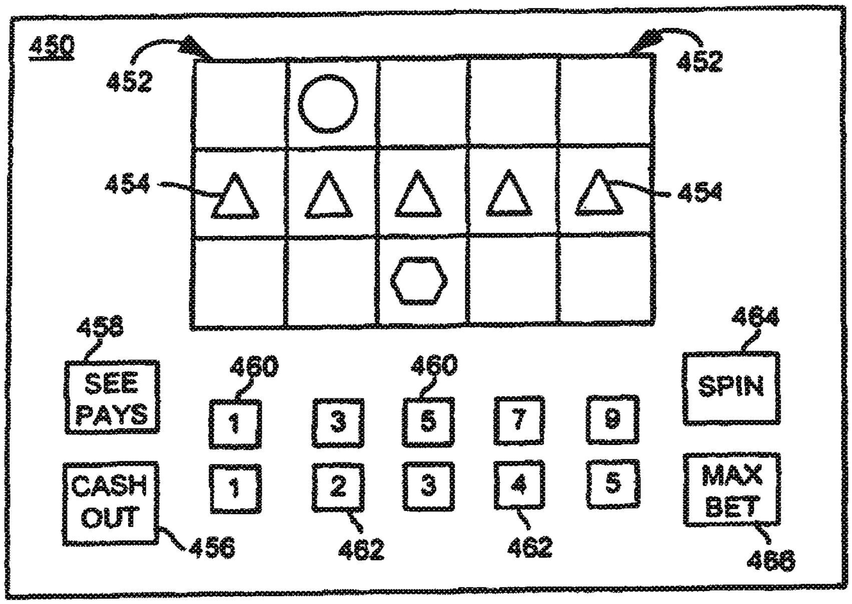
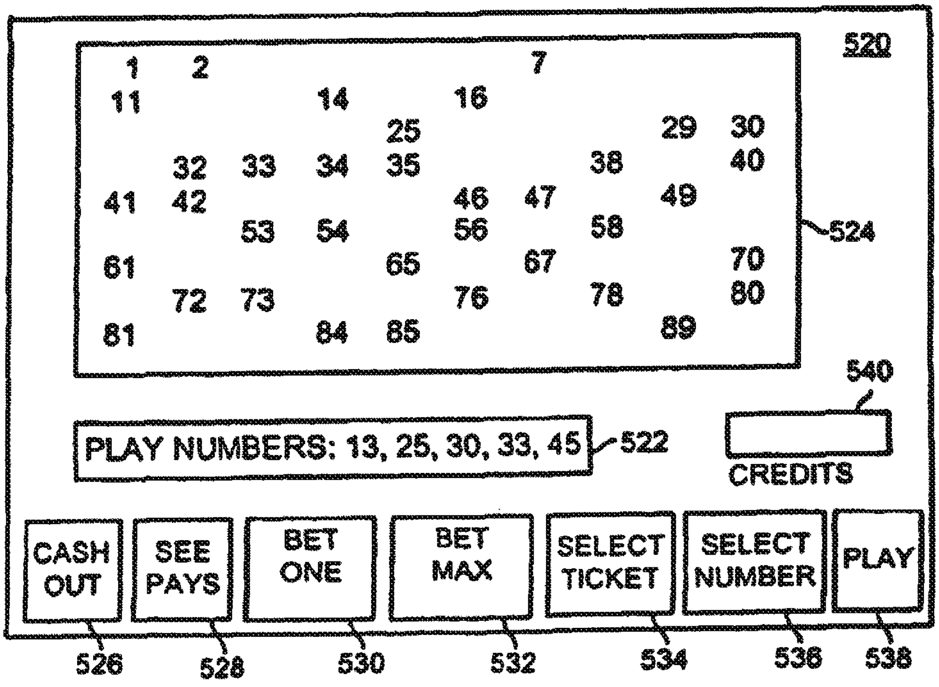
FIG. 13

WIDE SCREEN GAMING APPARATUS

RELATED APPLICATION

This application is a continuation of U.S. application Ser. No. 11/377,070, filed Mar. 16, 2006, which is a continuation of U.S. application Ser. No. 09/967,348, filed Sep. 28, 2001, the disclosures of which are hereby incorporated by reference in their entirety for all purposes.

BACKGROUND OF THE INVENTION

Video displays on gaming apparatuses have two spatial dimensions, i.e. horizontal and vertical. An aspect ratio of a video display is a ratio of horizontal length (width) to vertical length (height), expressed in relative units. Conventional video images displayed on conventional video displays have an aspect ratio of four to three (4:3) or 1.33 when reduced. The aspect ratio is essentially an aesthetic consideration or value. In other words, it is the rectangular shape most pleasing to the human eye. It has recently been determined that larger aspect ratios, such as 16:10 (1.6) or greater, are more aesthetically pleasing.

Video displays having larger aspect ratios are often referred to as wide screen displays. One reason wide screen displays are preferred is that when a human head is in a fixed position, the limit of peripheral vision is 60 degrees horizontally and 45 degrees vertically. These calculations are taken from Woodson's Human Factors Design Handbook. Thus, a wider picture is easier to view than a higher picture. There exists an even greater benefit to wide screen video displays when viewing action. Because of the limitations of players' eye response time, players can visualize more action on a wide screen display. This leads to greater active involvement on the part of players. Wide screen video displays also provide the ability to design and present video casino games that capitalize on the wide screen format that could not effectively be displayed on conventional video displays.

SUMMARY OF THE INVENTION

The invention is directed to a gaming apparatus with a display support structure and a display unit capable of generating video images. The display unit may be attached to the display support structure in a position that is non-rotatable about an axis substantially perpendicular to a plane formed by a front surface of the display unit. The display unit may comprise a flat-panel display screen having a width and a height, the width of the flat-panel display screen being larger than the height of the flat-panel display screen. The width of the flat-panel display screen divided by the height of the flat-panel display screen may form an aspect ratio having a magnitude greater than or equal to 16:10.

The gaming apparatus also includes a value input device that is capable of allowing the player to deposit a medium of value. The gaming apparatus may also comprise a controller, wherein the controller is operatively coupled to the display unit and the value input device. The controller may have a processor and a memory operatively coupled to the processor. Additionally, the controller may be programmed to allow a person to make a wager and to cause a video image to be generated on the display unit after the value input device detects deposit of value by the person.

The video image may represent a game selected from the group of games consisting of video poker, video blackjack, video slots, video keno and video bingo, in which case the video image may comprise an image of at least five playing cards if the game comprises video poker. Likewise, the video image may comprise an image of a plurality of playing cards if the game comprises video blackjack. If the game selected by the player is video slots, the video image may comprise an image of a plurality of simulated slot machine reels. The video image may comprise an image of a plurality of keno numbers if the game comprises video keno, or the video image may comprise an image of a bingo grid if the game comprises video bingo. The controller may also be programmed to determine a value payout associated with the outcome of the game. The apparatus may also comprise a display interface operatively connected to the controller and the display unit and a touchscreen sensor located in a plane that is substantially parallel to the front surface of the display unit and associated with the flat-panel display screen.

The features and advantages of the present invention will be apparent to those of ordinary skill in the art in view of the detailed description of various embodiments, which is made with reference to the drawings, a brief description of which is provided below.

BRIEF DESCRIPTION OF THE DRAWINGS

FIG. 12 is an illustration of an embodiment of a visual display that may be displayed during performance of the slots routine of FIG. 14;

FIG. 13 is an illustration of an embodiment of a visual display that may be displayed during performance of the video keno routine of FIG. 15;

DETAILED DESCRIPTION OF VARIOUS EMBODIMENTS

Figure 1:
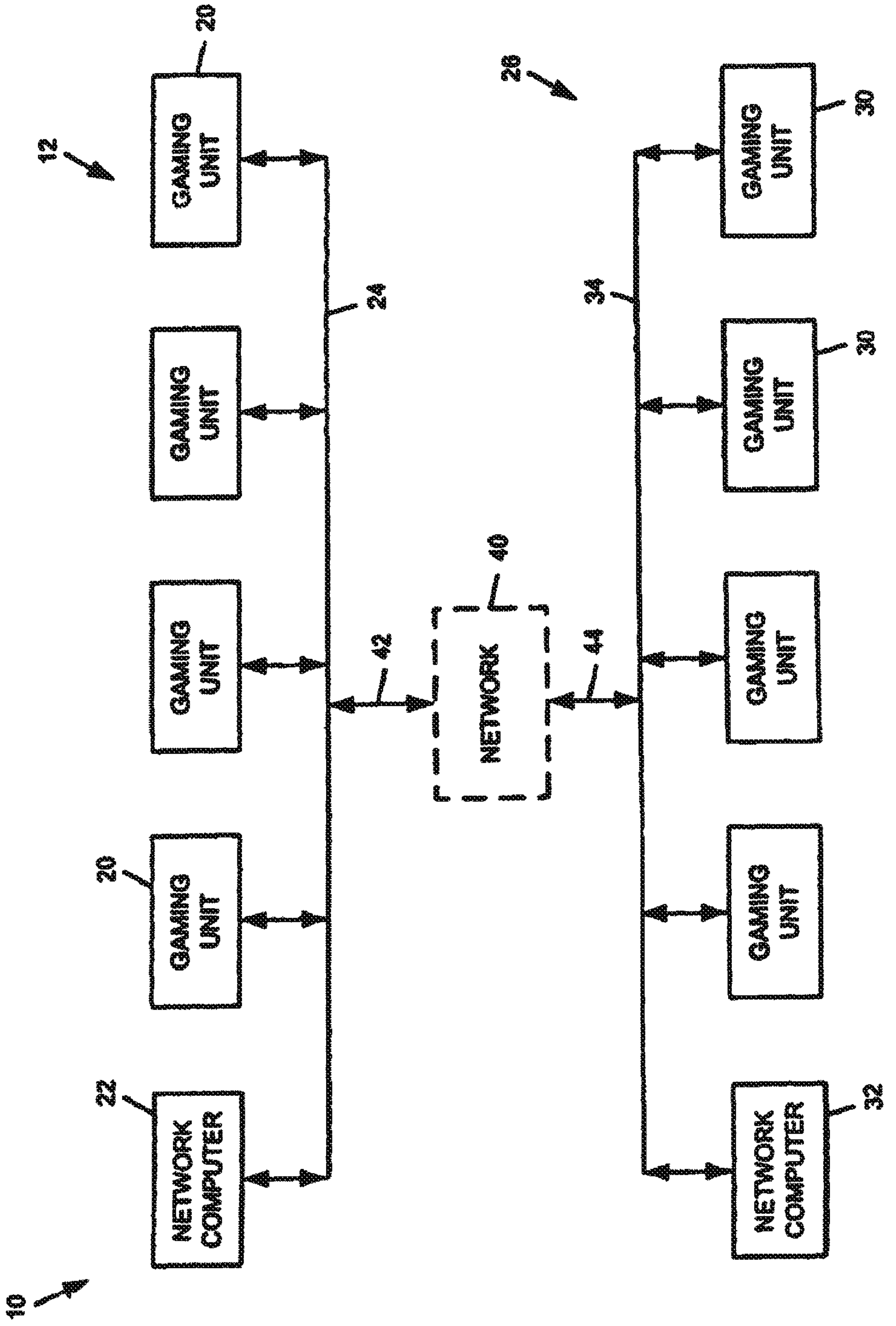
FIG. 1 is a block diagram of an embodiment of a gaming system in accordance with the invention.

FIG. 1 illustrates an embodiment of a gaming system 10 in accordance with the invention. Referring to FIG. 1, the gaming system 10 may include a first group or network 12 of gaming units 20 operatively coupled to a network computer 22 via a network data link or bus 24. The gaming system 10 may include a second group or network 26 of gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino or facility, and the second network 26 of gaming units 30 may be provided in a second casino or facility located in a separate geographic location than the first casino or facility. For example, the two facilities may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

It should also be noted that the terms gaming apparatus and gaming unit are intended to be interchangeable. Additionally, the terms are intended to include video lottery terminals. Video lottery terminals operate essentially the same as gaming apparatuses found in state regulated casinos or other facilities, except that they generally use ticket printers to print tickets that can be exchanged for cash payments instead of paying winning amounts through a coin hopper as in conventional gaming apparatuses.

Figure 2:
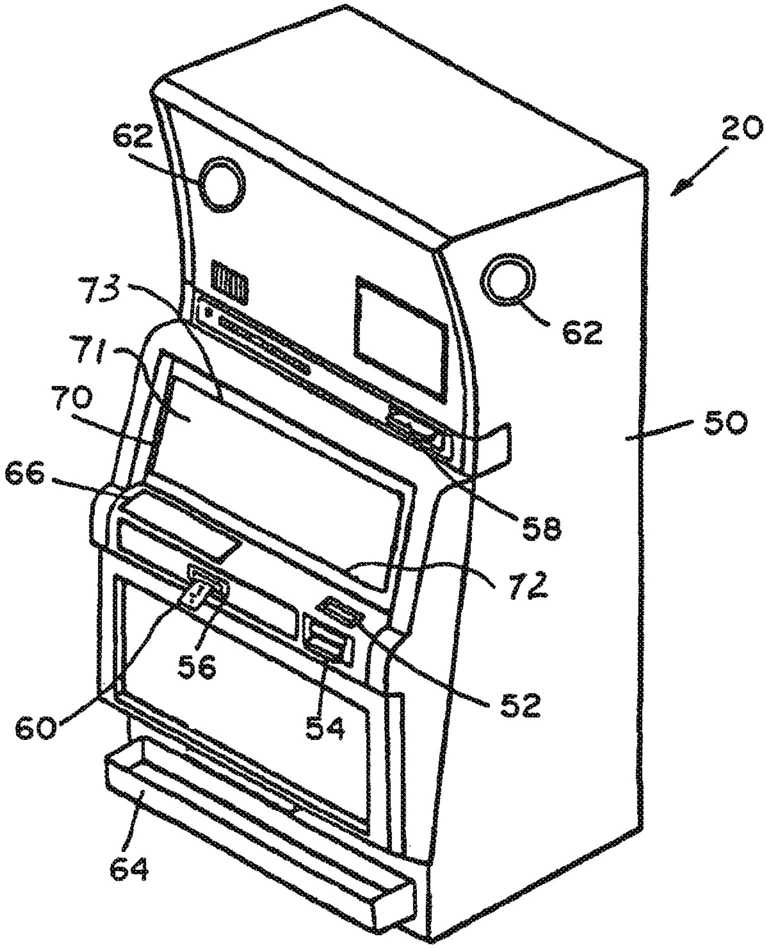
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of gaming unit and may have various different structures and methods of operation. For exemplary purposes, various designs of the gaming units 20 are described below, but it should be understood that numerous other designs may be utilized.

Referring to FIG. 2, the gaming apparatus or unit 20 may include a display support structure 50, which may also be referred to as a housing or cabinet. The display support structure 50 may include one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the facility name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader, and may be used to read data from a card offered by a player, such as a credit card, a player tracking card, a smart card, etc. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The display unit 70 may be attached to the display support structure 50 in a position that is non-rotatable about an axis substantially perpendicular to a plane formed by a front surface of the display unit. In other words, the display unit may be adjustable, but it may not be rotated, for instance 90 degrees, so that the vertical length (height) is greater than the horizontal length (width). The display unit 70 may comprise a display screen 71 having a width and a height, wherein the width of the display screen 71 is larger than the height of the display screen 71. The display screen 71 may be disposed so that the width of the display screen 71 is parallel to the width of the display unit 70 and so that the height of the display screen 71 is parallel to the height of the display unit 70.

The width of the display screen 71 divided by the height of the display screen 71 forms an aspect ratio having a magnitude greater than 16:10 or 1.6. This may be referred to as a wide screen display. Two wide screen formats that are commonly utilized by manufacturers are 16:10 and 16:9. However, wide screen displays having much larger aspect ratios may also be utilized. For example, a display screen having an aspect ration of 3:1 could be used.

The display screen 71 may be a flat-panel display screen, such as an LCD (liquid crystal display), a plasma display, a front projection monitor, or any other type of display that has an overall thickness less than conventional CRTs (cathode ray tubes). The display unit 70 may be adjusted to enhance the angle of viewing for a player. For example, the display unit 70 may be adjusted vertically on the display support structure 50. Additionally, the display unit 70 may be rotatably adjusted about a horizontal axis that is generally parallel to a horizontal edge 72 of the display screen 71. This will ensure that users of different heights will be able to directly view the display screen 71 at an appropriate angle.

The display unit 70 may also display video images comprising DTV video images. While a vast array of different picture-resolution formats may be displayed, a few examples include HDTV (high definition television) and SDTV (standard definition television). The image displayed in these formats may comprise either progressively scanned (-p) or interlaced (-i). Video images may be scanned on the display screen 71 either way. Interlacing, used for conventional TVs, assemble each frame in two alternating fields, first tracing every other line, then filling in the gaps. Progressive scanning, a technique often used in conventional computer displays because of its ability to display graphics well, paints each line successively to create a frame in one pass.

One example of a high quality and information heavy DTV resolution that may be displayed by the display unit 70 is the 1080 i format. It may have 1,080 interlaced scanning lines, each with 1,920 pixels, to deliver more than 2 million pixels per picture frame. Another example of an HD format that may be displayed is the 720 p, which has 720 progressively scanned lines that carry 1,280 pixels each, totaling nearly 1 million pixels. Also, a video image utilizing a 1080 p format could also be displayed. An example of a possible SDTV format is a 480 p which progressively scans 480 lines and totals 337,920 pixels per frame.

An integrated touchscreen sensor 73 may also be included with the display unit 70 to overlay the display screen 71. The touchscreen sensor 73 may be located in a plane that is substantially parallel to the front surface of the display screen 71. A Microtouch sensor and controller is an example of a conventional touchscreen sensor that may be adapted for use with the gaming apparatus 20.

The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
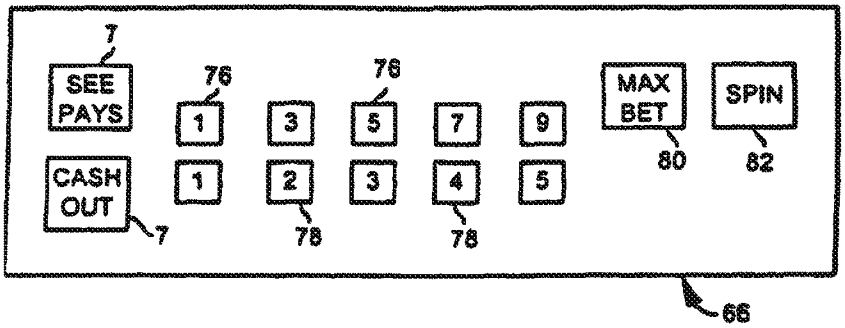
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 74 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 75 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 74, 75, 76, 78, 80, 82. It should be understood that that rectangle simply designates, for ease of reference, an area in which the buttons 74, 75, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen or the touchscreen sensor 73.

Gaming Unit Electronics

Figure 3:
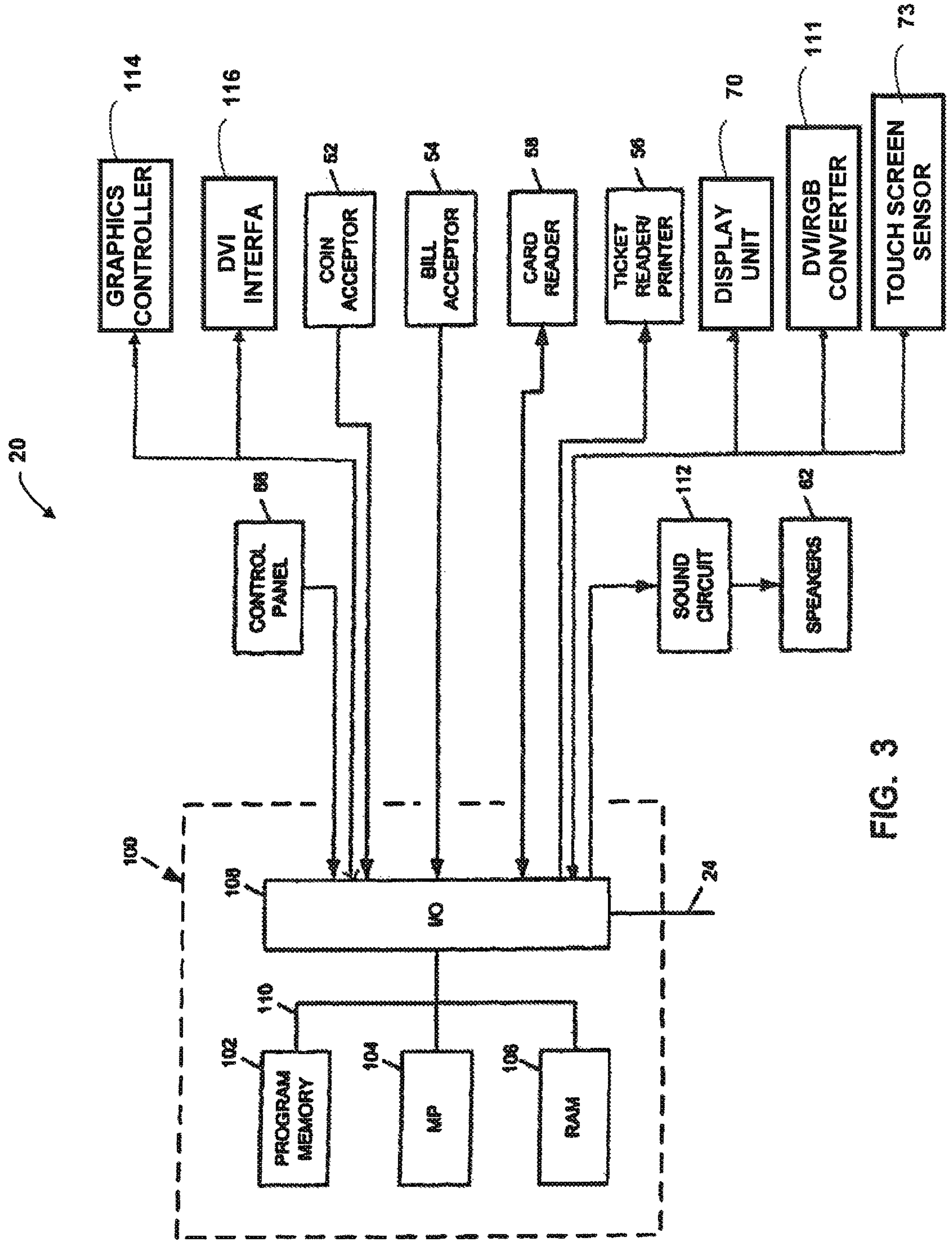
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 3 illustrates that the control panel 66, a graphics controller 114, the coin acceptor 52, the bill acceptor 54, the card reader 58, the ticket reader/printer 56, and the touchscreen sensor 73 may be operatively coupled to the I/O circuit 108, each of those components being so coupled by either a unidirectional or bidirectional, single-line or multiple-line data link, which may depend on the design of the component that is used. It should be noted that a separate graphics controller, such as graphics controller 114 may not be necessary, as the controller 100 may be utilized to perform the functions of the graphics controller 114, thus eliminating the need for a separate graphics controller. A display interface such as a digital video interface (DVI) 116 may be connected to the graphics controller 114 (or the controller 100, as seen by the dashed line). Alternatively, a display interface such as a DVI/RGB converter 111 may be connected to the graphics controller 114 (or the controller 100, as seen by the dashed line). The display unit 70 may be connected to either the DVI 116 or the DVI/RGB converter 111. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 70, 73, 111, 112, 114, and 116 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108. The I/O circuit 108 may include serial and USB interfaces also. These may be utilized to control, for example, the touchscreen sensor 73, switch inputs, light inputs, etc. The I/O circuit 108 may also be utilized to convert serial data from the controller 100 to a format used by the inputs and output modules. It may also be used to continuously monitor the inputs and update the outputs.

The wide-screen resolution graphics controller 114 may be operatively connected to the controller 100 and utilized to provide wide-screen video images. The DVI interface 116 may also be incorporated in the system and utilized to provide a true digital video interface to the display unit 70. The DVI/RGB converter 111 may be used to convert an analog RGB or digital DVI to the correct signal for the wide-screen display unit 70.

An Alternative Embodiment

Figure 4:
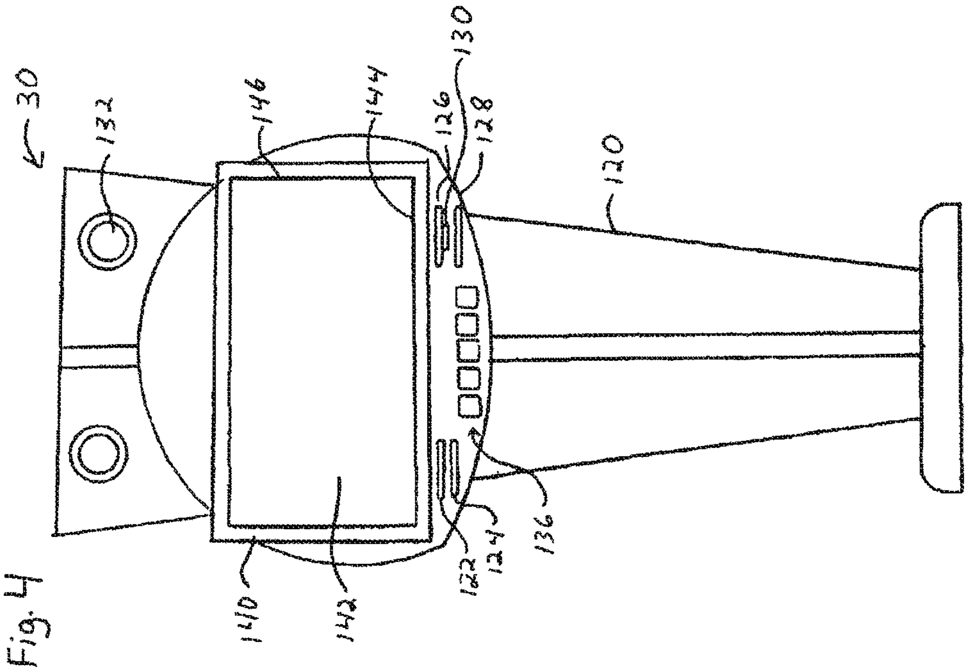
FIG. 4 is a front view of another example of a gaming apparatus in accordance with the teachings of the invention.

FIG. 4 is a front view of another possible embodiment of one or more of the gaming units 30. The gaming apparatus or unit 30 may include a display support structure 50, which may also be referred to as a housing or cabinet. The display support structure 50 may include one or more input devices, which may include a coin slot or acceptor 122, a paper currency acceptor 124, a ticket reader/printer 126 and a card reader 128, which may be used to input value to the gaming unit 30. A value input device may include any device that can accept value from a customer. As used herein, the term "value" may encompass gaming tokens, coins, paper currency, ticket vouchers, credit or debit cards, and any other object representative of value.

If provided on the gaming unit 30, the ticket reader/printer 126 may be used to read and/or print or otherwise encode ticket vouchers 130. The ticket vouchers 130 may be composed of paper or another printable or encodable material and may have one or more of the following informational items printed or encoded thereon: the facility name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 130 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 130 could be printed with an optically readable material such as ink, or data on the ticket vouchers 130 could be magnetically encoded. The ticket reader/printer 126 may be provided with the ability to both read and print ticket vouchers 130, or it may be provided with the ability to only read or only print or encode ticket vouchers 130. In the latter case, for example, some of the gaming units 30 may have ticket printers 126 that may be used to print ticket vouchers 130, which could then be used by a player in other gaming units 20 or 30 that have ticket readers 126.

If provided, the card reader 128 may include any type of card reading device, such as a magnetic card reader or an optical card reader, and may be used to read data from a card offered by a player, such as a credit card or a player tracking card. If provided for player tracking purposes, the card reader 128 may be used to read data from, and/or write data to, player tracking cards that are capable of storing data representing the identity of a player, the identity of a casino, the player's gaming habits, etc.

The gaming unit 30 may include one or more audio speakers 132, an input control panel 136, and a color video display unit 140 for displaying images relating to the game or games provided by the gaming unit 30. The display unit 140 may be attached to the display support structure 120 in a position that is non-rotatable about an axis substantially perpendicular to a plane formed by a front surface of the display unit. In other words, the display unit may be adjustable, but it may not be rotated, for instance 90 degrees, so that the vertical length (height) is greater than the horizontal length (width). The display unit 140 may comprise a display screen 142 having a width and a height, wherein the width of the display screen 142 is larger than the height of the display screen 142. The display screen 142 may be disposed so that the width of the display screen 142 is parallel to the width of the display unit 140 and so that the height of the display screen 142 is parallel to the height of the display unit 140.

The width of the display screen 142 divided by the height of the display screen 142 forms an aspect ratio having a magnitude greater than 16:10 or 1.6. This may be referred to as a wide screen display. Two wide screen formats that are commonly utilized by manufacturers are 16:10 and 16:9. For reference, an aspect ration of 16:9 is wider than an aspect ration of 16:10. However, wide screen displays having much larger aspect ratios may also be utilized. For example, a display screen having an aspect ration of 3:1 could be used.

The display screen 142 may be a flat-panel display screen, such as an LCD (liquid crystal display), a plasma display, a front projection monitor, or any other type of display that has an overall thickness less than conventional CRTs (cathode ray tubes). The display unit 140 may be adjusted to enhance the angle of viewing for a player. For example, the display unit 140 may be adjusted vertically on the display support structure 120. Additionally, the display unit 140 may be rotatably adjusted about a horizontal axis that is generally parallel to a horizontal edge 144 of the display screen 142. This will ensure that users of different heights will be able to directly view the display screen 142 at an appropriate angle.

The display unit 140 may also display video images comprising DTV video images. While a vast array of different picture-resolution formats may be displayed, a few examples include HDTV (high definition television) and SDTV (standard definition television). The image displayed in these formats may comprise either progressively scanned (-p) or interlaced (-i). Video images may be scanned on the display screen 71 either way. Interlacing, used for conventional TVs, assemble each frame in two alternating fields, first tracing every other line, then filling in the gaps. Progressive scanning, a technique often used in conventional computer displays because of its ability to display graphics well, paints each line successively to create a frame in one pass.

One example of a high quality and information heavy DTV resolution that may be displayed by the display unit 140 is the 1080 i format. It may have 1,080 interlaced scanning lines, each with 1,920 pixels, to deliver more than 2 million pixels per picture frame. Another example of an HD format that may be displayed is the 720 p, which has 720 progressively scanned lines that carry 1,280 pixels each, totaling nearly 1 million pixels. Also, a video image utilizing a 1080 p format could also be displayed. An example of a possible SDTV format is a 480 p which progressively scans 480 lines and totals 337,920 pixels per frame.

An integrated touchscreen sensor 146 may also be included with the display unit 140 to overlay the display screen 142. The touchscreen sensor 146 may be located in a plane that is substantially parallel to the front surface of the display screen 142. A Microtouch sensor and controller is an example of a conventional touchscreen sensor that may be adapted for use with the gaming apparatus 30.

The audio speakers 132 may generate audio representing sounds such as the noise of spinning slot machine reels, a dealer's voice, music, announcements or any other audio related to a casino game. The input control panel 136 may be provided with a plurality of pushbuttons or touch-sensitive areas that may be pressed by a player to select games, make wagers, make gaming decisions, etc. The control panel 136 may comprise the same control options as described with reference to FIG. 2A. Therefore, the description for the control panel 66 from FIG. 2A is hereby incorporated into the description for FIG. 4. The gaming apparatus 30 may also include the components described with reference to FIG. 3. The gaming unit electronics described in that section are thus hereby incorporated with reference to FIG. 4.

Figure 5:
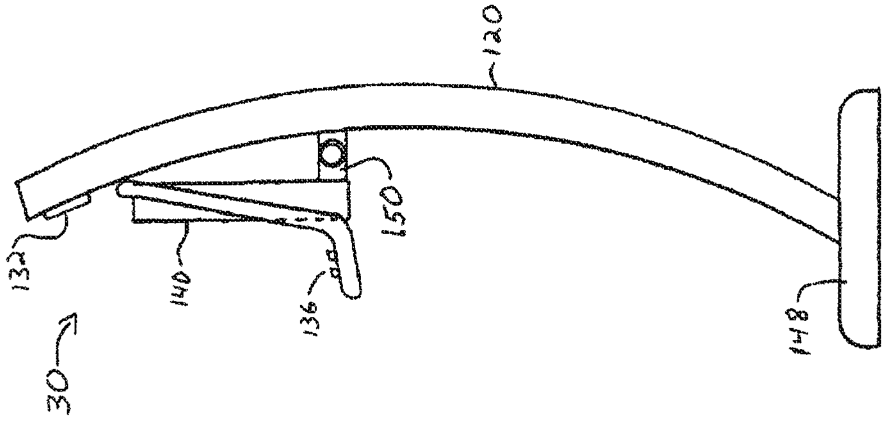
FIG. 5 is a side view of another example of a gaming apparatus in accordance with the teachings of the invention.

FIG. 5 is a side view of the gaming apparatus 30 from FIG. 4. The gaming apparatus 30 shows a side view of the display support structure 120, the speakers 132, the display unit 140, and the control panel 136. The gaming apparatus also includes a support base 148 and an adjustable mounting bracket 150.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 6:
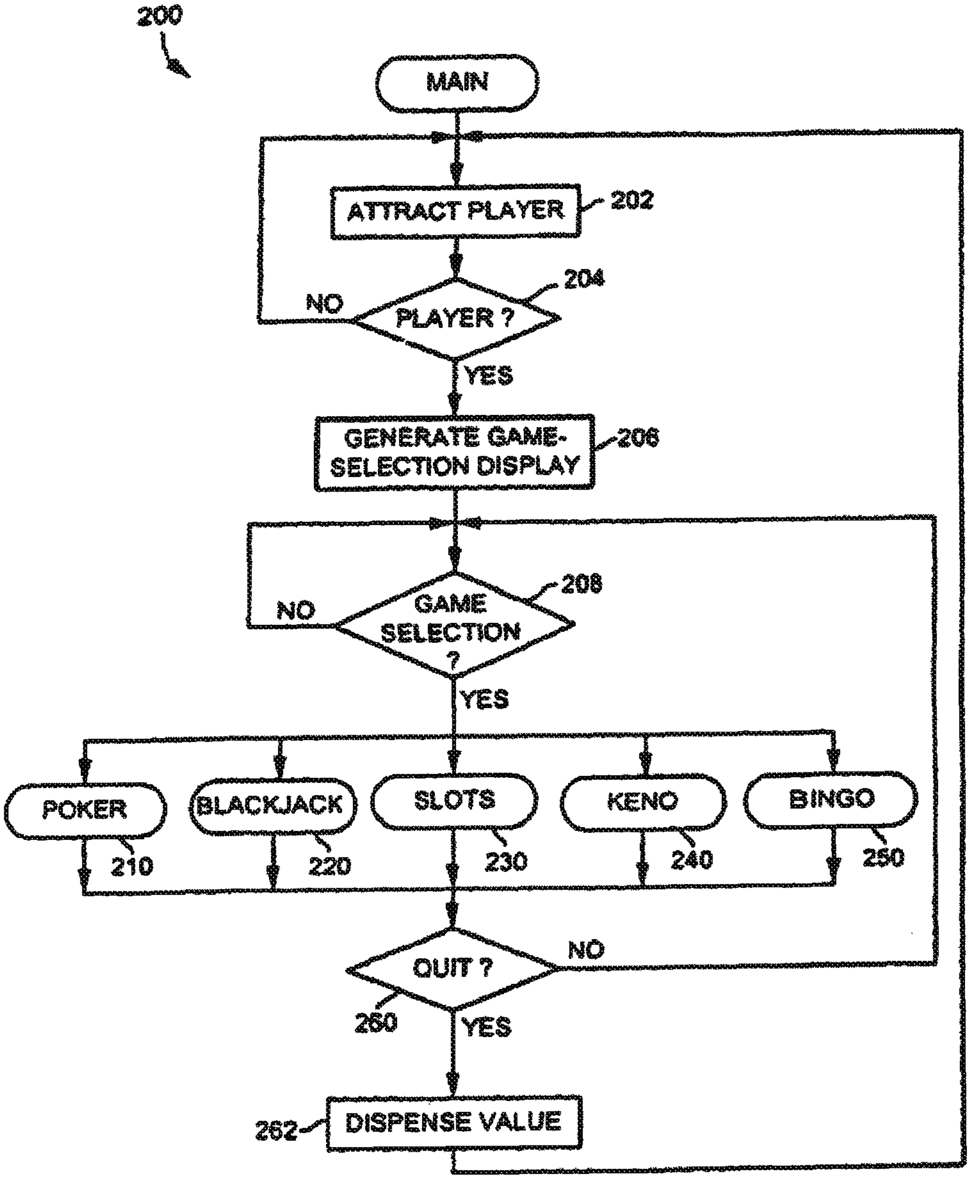
FIG. 6 is a flowchart of an embodiment of a main routine that may be performed during operation of one or more of the gaming units.

FIG. 6 is a flowchart of a main operating routine 200 that may be stored in the memory of the controller 100. Referring to FIG. 6, the main routine 200 may begin operation at block 202 during which an attraction sequence may be performed in an attempt to induce a potential player in a casino or other facility to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 6, a different number of routines could be included to allow play of a different number of games. The gaming unit 20 may also be programmed to allow play of different games.

Figure 7:
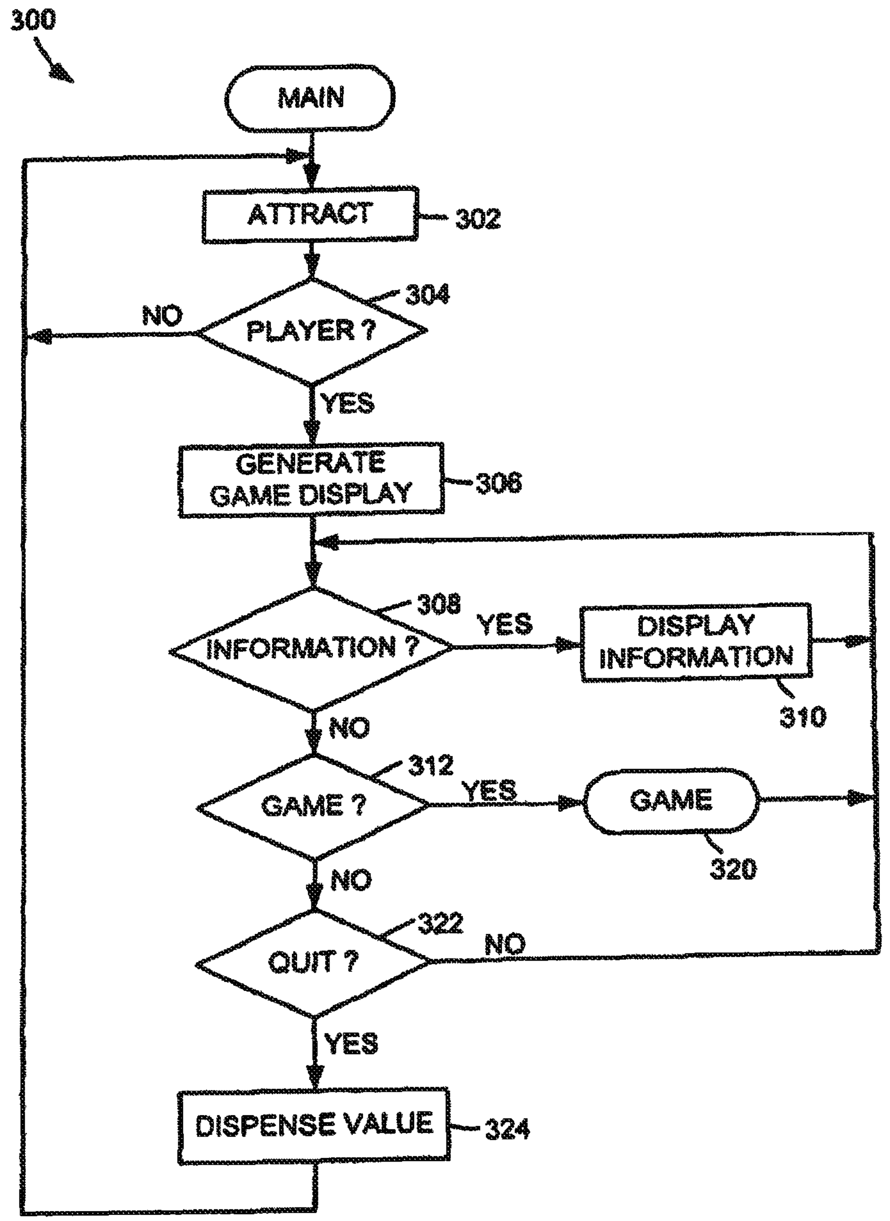
FIG. 7 is a flowchart of an alternative embodiment of a main routine that may be performed during operation of one or more of the gaming units.

FIG. 7 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 8:
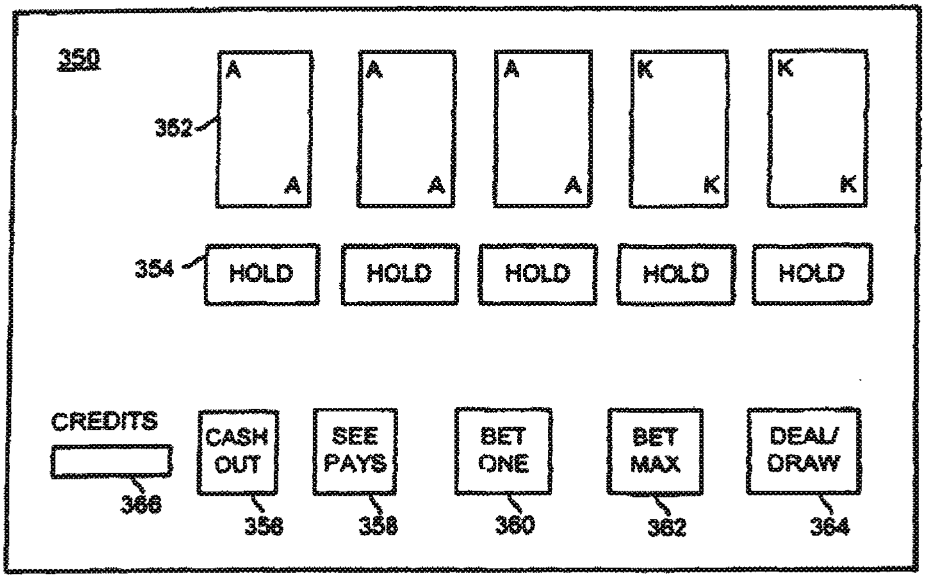
FIG. 8 is an illustration of an embodiment of a visual display that may be displayed during performance of the video poker routine of FIG. 10.

FIG. 8 is an exemplary display 350 that may be shown on the display unit 70 during performance of the video poker routine 210 shown schematically in FIG. 6. Referring to FIG. 8, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 10:
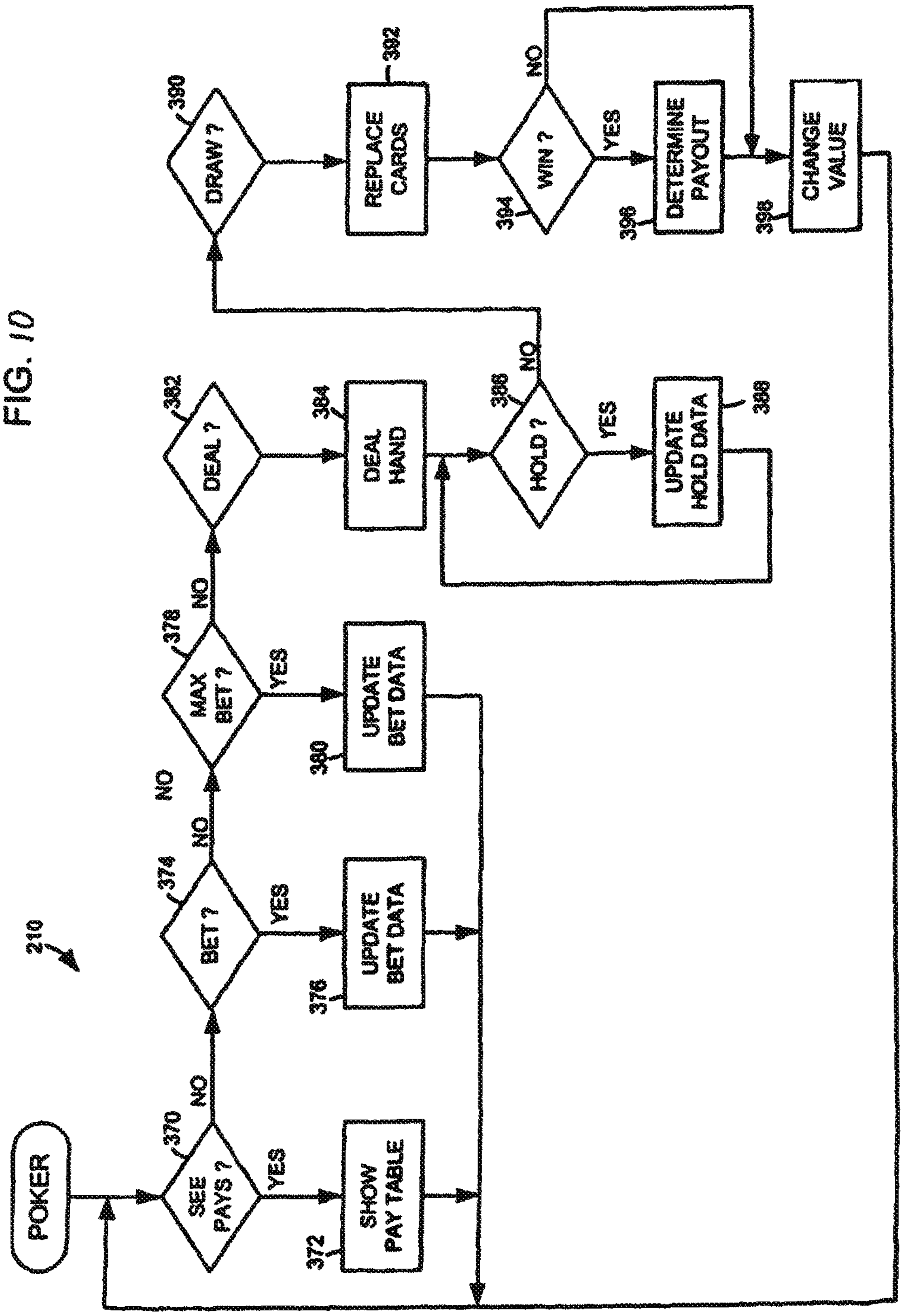
FIG. 10 is a flowchart of an embodiment of a video poker routine that may be performed by one or more of the gaming units.

FIG. 10 is a flowchart of the video poker routine 210 shown schematically in FIG. 6. Referring to FIG. 10, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. If the player does not desire a new hand to be drawn, then the routine will return to the block 370. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 8).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 9:
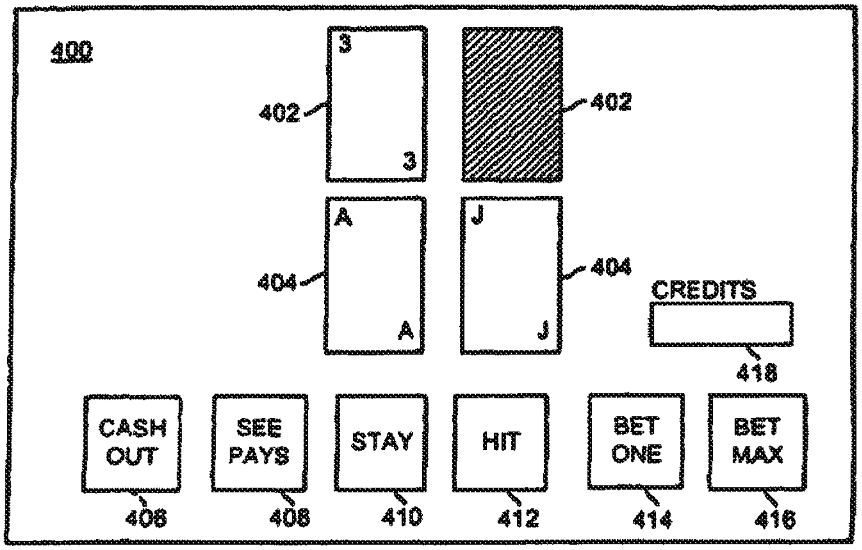
FIG. 9 is an illustration of an embodiment of a visual display that may be displayed during performance of the video blackjack routine of FIG. 11.

FIG. 9 is an exemplary display 400 that may be shown on the display unit 70 during performance of the video blackjack routine 220 shown schematically in FIG. 6. Referring to FIG. 9, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 11:
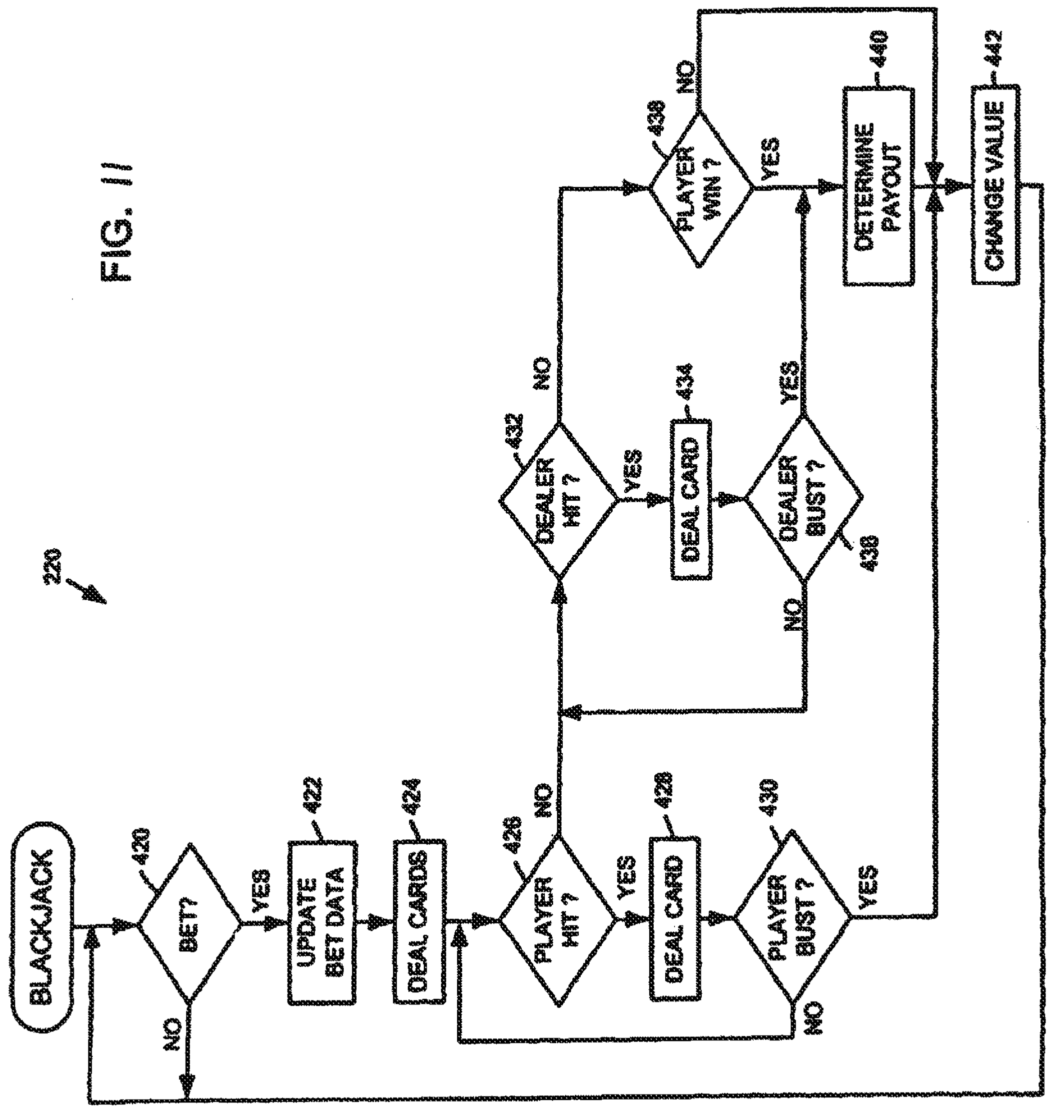
FIG. 11 is a flowchart of an embodiment of a video blackjack routine that may be performed by one or more of the gaming units.

FIG. 11 is a flowchart of the video blackjack routine 220 shown schematically in FIG. 6. Referring to FIG. 11, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. If the player chooses to deal a hand at a block 423, the routine will deal hands at a block 424. If the player does not want to deal a hand, the routine will go back to the bet block 420. At the block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 9).

Slots

FIG. 12 is an exemplary display 450 that may be shown on the display unit 70 during performance of the slots routine 230 shown schematically in FIG. 6. Referring to FIG. 12, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 14:
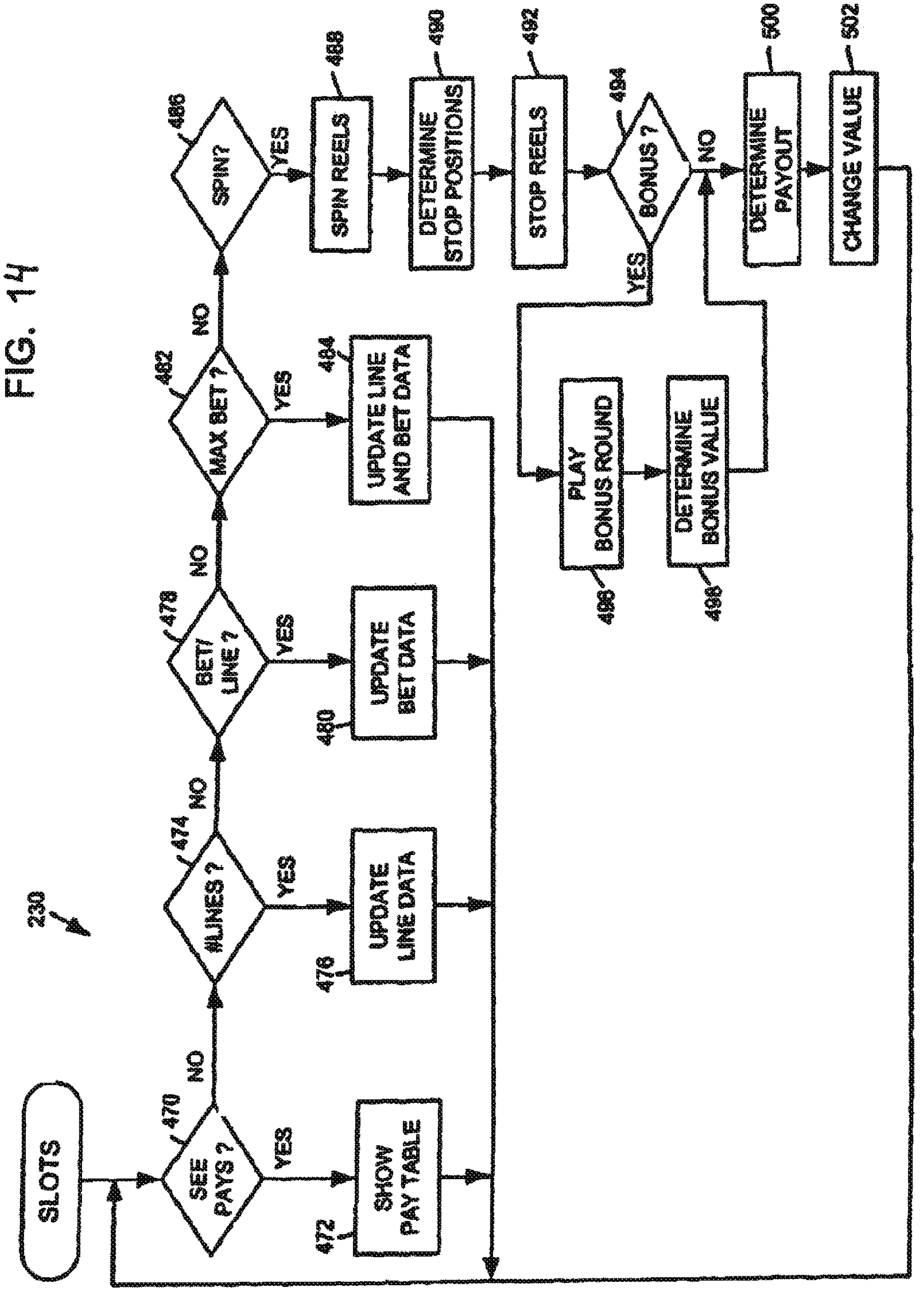
FIG. 14 is a flowchart of an embodiment of a slots routine that may be performed by one or more of the gaming units.

FIG. 14 is a flowchart of the slots routine 230 shown schematically in FIG. 12. Referring to FIG. 14, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100. The routine may then cause the slot machine reel images 452 to begin "spining" so as to simulate the appearance of a plurality of spinning mechanical slot machine reels at a block 488.

If the "Spin" button 464 has been activated by the player as determined at block 486, at the block 488 the routine may cause the slot machine reel images 452 to begin "spining" so as to simulate the appearance of a plurality of spinning mechanical slot machine reels. If the "Spin" button 464 has not been activated by the player, the routine will return to the "See Pays" block 470. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 13 is an exemplary display 520 that may be shown on the display unit 70 during performance of the video keno routine 240 shown schematically in FIG. 6. Referring to FIG. 13, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 15:
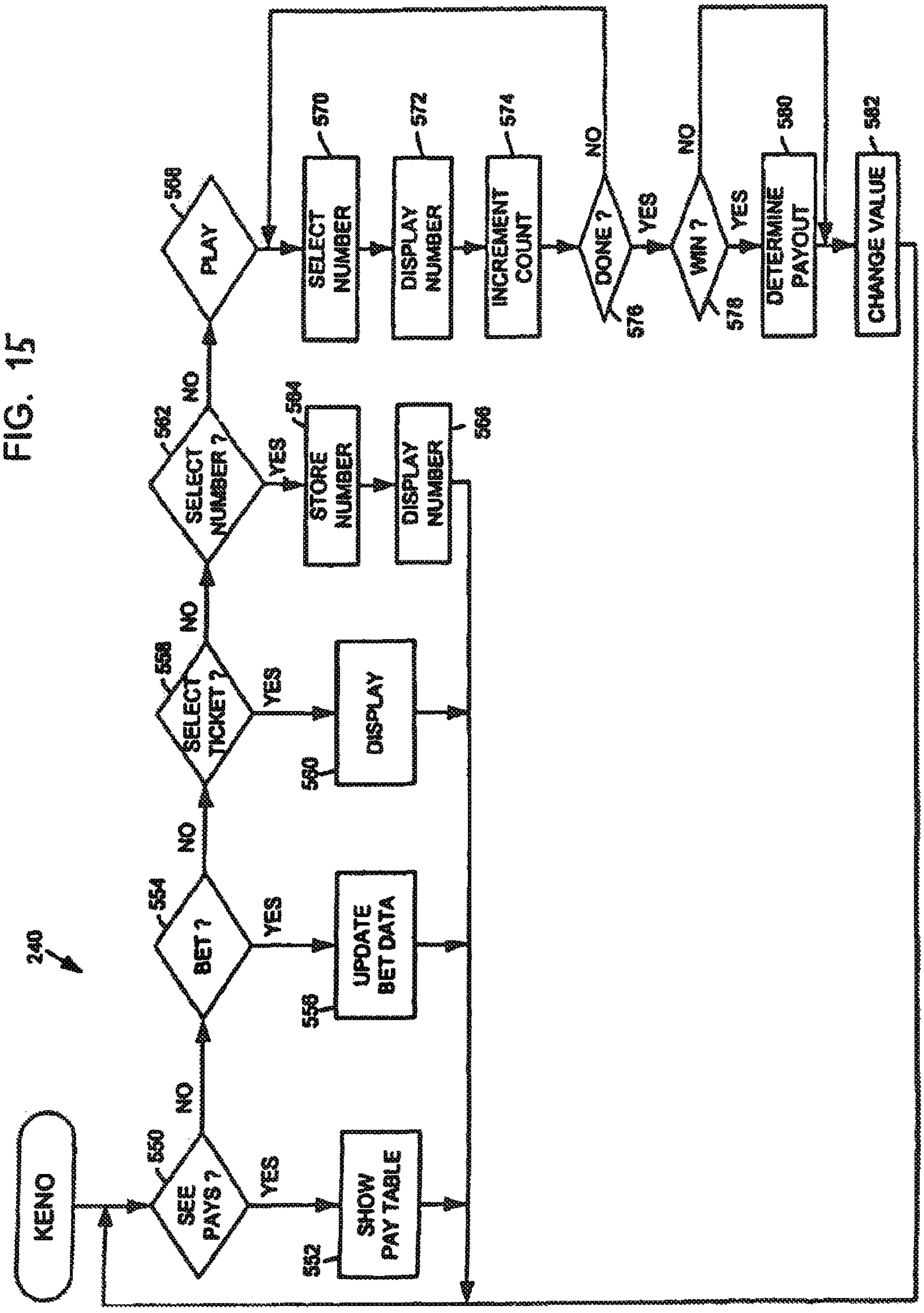
FIG. 15 is a flowchart of an embodiment of a video keno routine that may be performed by one or more of the gaming units.

FIG. 15 is a flowchart of the video keno routine 240 shown schematically in FIG. 6. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 15 at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. If the play activity is not desired, the routine will return the player to the "See Pays" block 550. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 13).

Video Bingo

Figure 16:
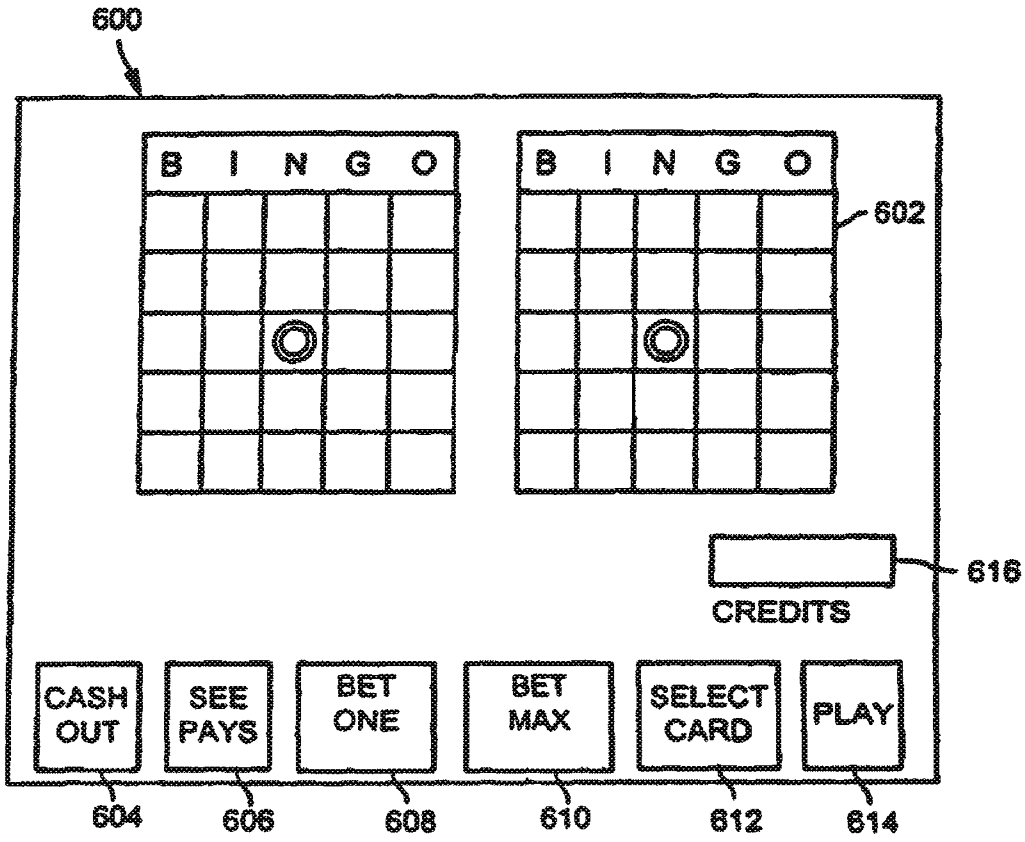
FIG. 16 is an illustration of an embodiment of a visual display that may be displayed during performance of the video bingo routine of FIG. 17.

FIG. 16 is an exemplary display 600 that may be shown on the display unit 70 during performance of the video bingo routine 250 shown schematically in FIG. 6. Referring to FIG. 16, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 17:
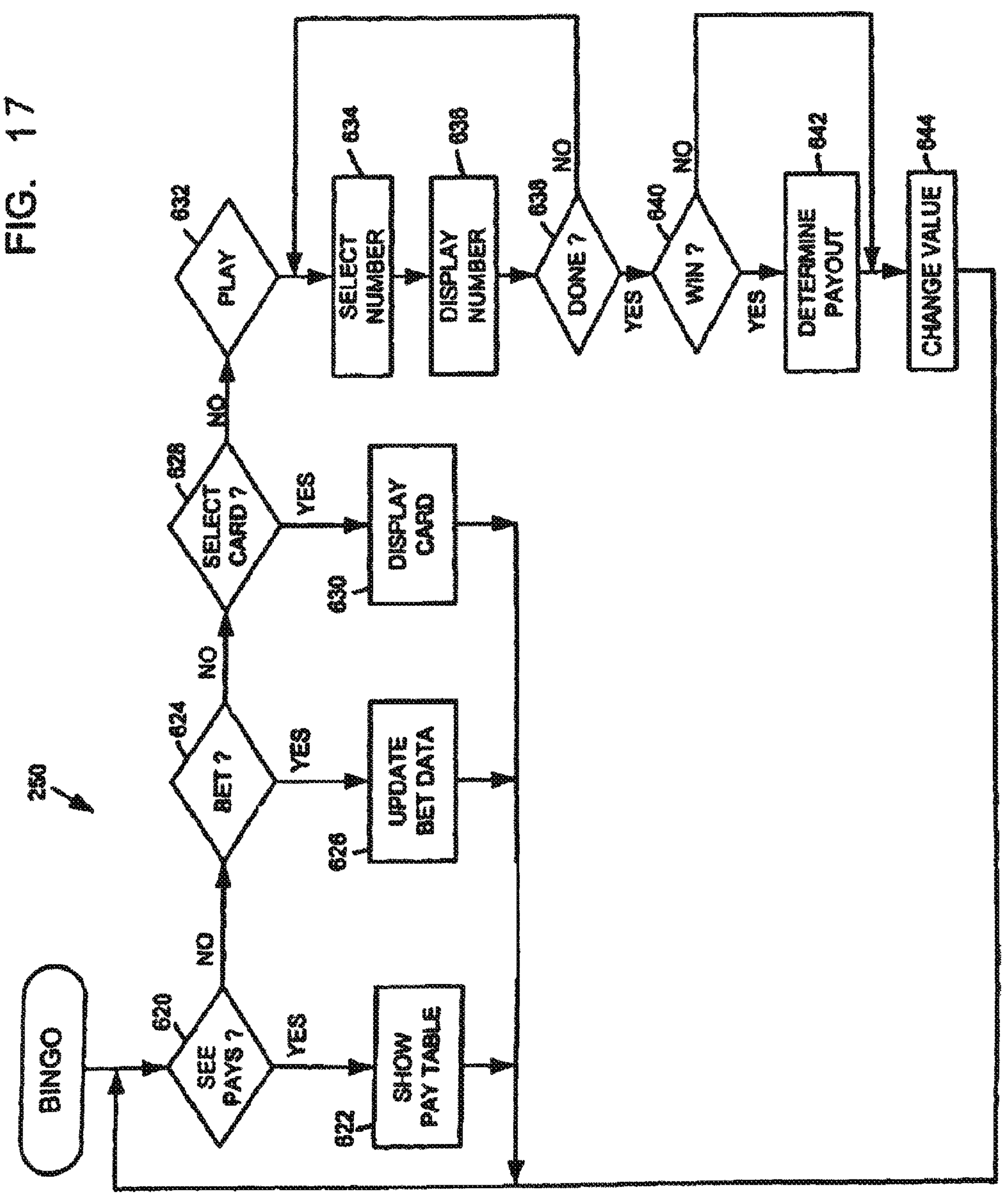
FIG. 17 is a flowchart of an embodiment of a video bingo routine that may be performed by one or more of the gaming units.

FIG. 17 is a flowchart of the video bingo routine 250 shown schematically in FIG. 6. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 17, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game. If play is not continued at the block 632, then the routine returns to the "See Pays" block 620.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 16).

Games Specially Adapted for Wide-Screen Displays

Figure 18:
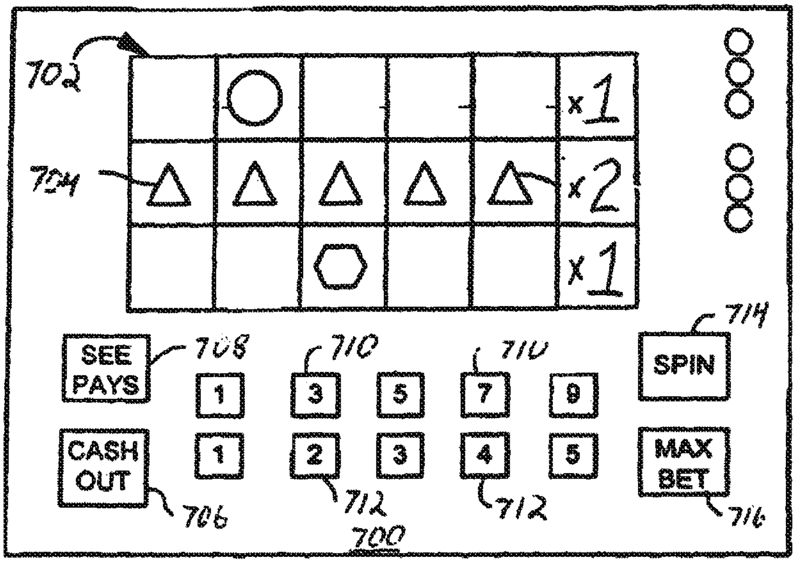
FIGS. 18-21 are illustrations of embodiments of a visual displays for specialized video games that may be displayed on a gaming apparatus having a wide screen display.

FIG. 18 is an exemplary display 700 that may be shown on the display unit 70 during performance of a slots routine similar to the routine 230 described in FIG. 6.

Referring to FIG. 18, the display 700 may include video images 702 of a plurality of slot machine reels, each of the reels having a plurality of reel symbols 704 associated therewith. Although the display 700 includes six reel images 702, each of which may have three reel symbols 704 that are visible at a time, other reel configurations could be utilized. The first five reels 702 in the display 700 may include conventional symbols, allowing the sixth reel to be used as a multiplier. When using a wide screen display, the six reels 702 may be displayed without shrinking the width of the reels 702. Also, even more reels could be added to the display 700 to create a variety of unique games. For example, the additional reels could be part of a bonus game, multipliers, or a mega-reel slot game.

To allow the player to control the play of the slots game, a plurality of player-selectable buttons may be displayed. The buttons may include a "Cash Out" button 706, a "See Pays" button 708, a plurality of payline-selection buttons 710 each of which allows the player to select a different number of paylines prior to "spinning" the reels, a plurality of bet-selection buttons 712 each of which allows a player to specify a wager amount for each payline selected, a "Spin" button 714, and a "Max Bet" button 716 to allow a player to make the maximum wager allowable.

Figure 19:
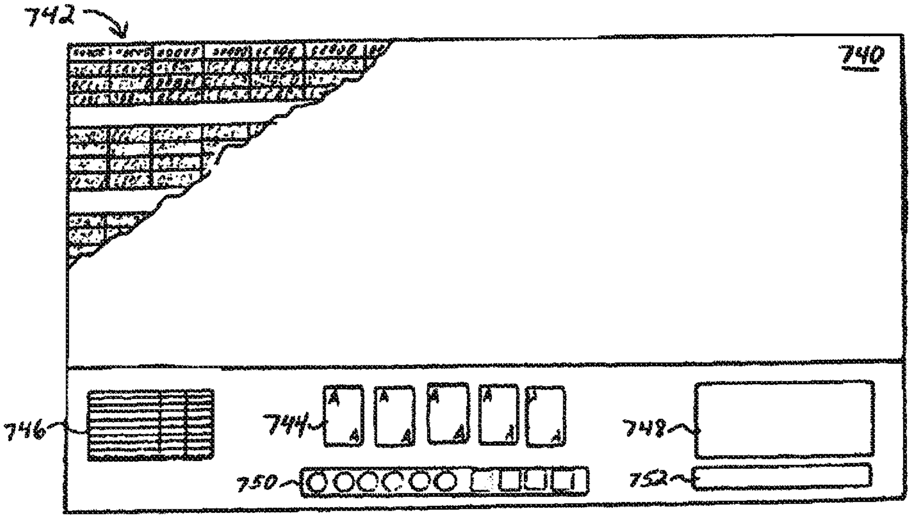

FIG. 19 is an exemplary display 740 that may be shown on the display unit 70 during performance of a 500 Play Poker game utilizing a modified version of the poker routine 210 shown schematically in FIG. 6. Referring to FIG. 19, the display 740 may include video images 742 of 499 poker hands, wherein each card is clearly displayed and legible. The display 740 may also include an additional poker hand 744 that is enlarged in comparison to the cards displayed in the poker hands 742. The display 740 may also include a pay table 746 and a play status section 748.

To allow the player to control the play of the video poker games, a plurality of player-selectable buttons may be displayed. These buttons may be located in a control section 750, and may include "Hold" buttons, a "Cash Out" button, a "See Pays" button, a "Bet One Credit" button, a "Bet Max Credits" button, and a "Deal/Draw" button. The display 740 may also include an area 752 in which the number of remaining credits or value is displayed. If the display unit 70 is provided with a touch-sensitive screen, the buttons in the control section 750 may form part of the video display 740. Alternatively, one or more of those buttons may be provided as part of a control panel that is provided separately from the display unit 70.

Figure 20:
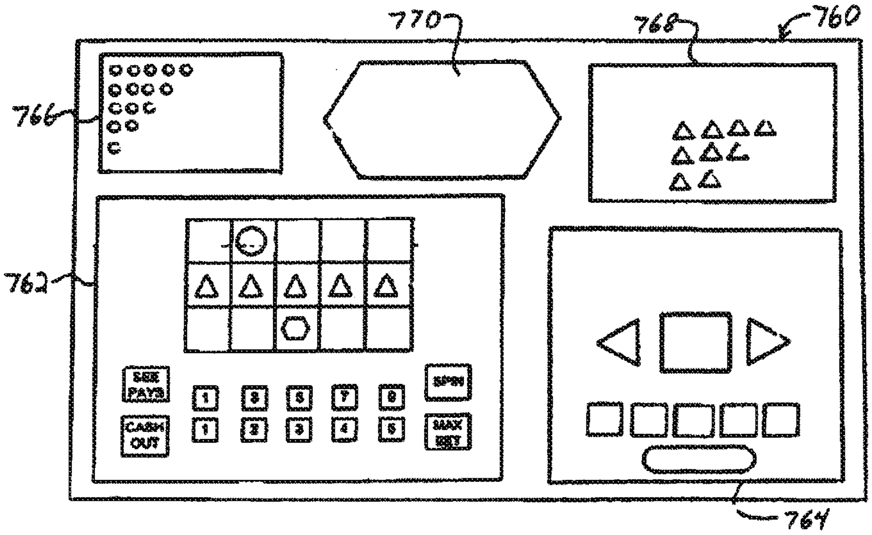

FIG. 20 is an exemplary display 760 that may be shown on the display unit 70 during performance of a slots routine similar to the routine 230 described in FIG. 6.

Referring to FIG. 20, the display 760 may include video images of a slots game that displays everything on a single display screen. The display 760 may include a video image of a conventional video slot game 762, wherein the video slot game 762 comprises a plurality of slot machine reels with each of the reels having a plurality of reel symbols associated therewith. The display 760 may include a bonus section 764, a first paytable section 766, and a second paytable section 768. A section 770 may include an image that is often found on the belly glass of conventional gaming apparatuses. The display 760 does not require separate screen images for viewing. In conventional display units, the paytable(s) must be silk-screened on a top glass or displayed by selecting an icon such as "See Paytable," which replaces a previously displayed image with the paytable image. The issue is the same for the bonus section 764 too. With the display 760, a player can simultaneously see all sections 762, 764, 766, 768, and 770 on the same display screen.

Figure 21:
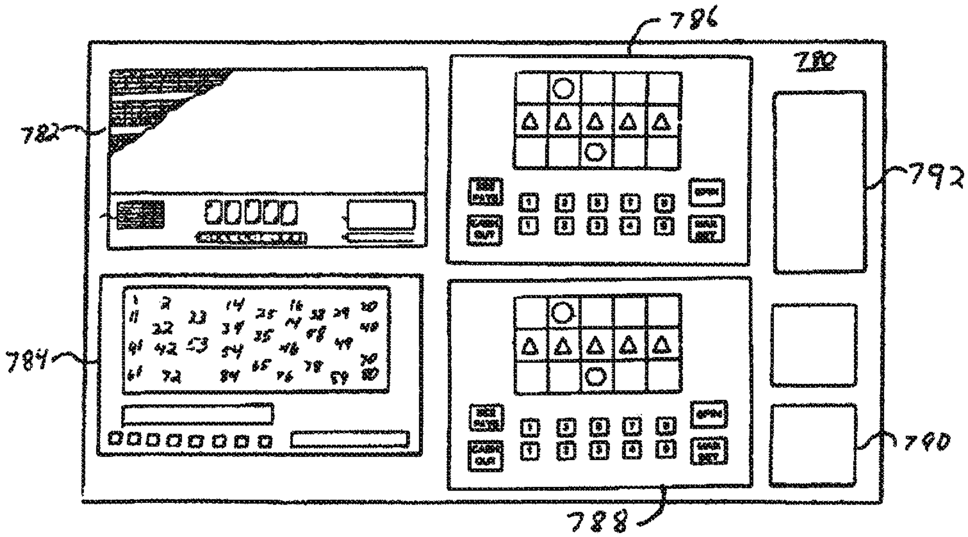

FIG. 21 is an exemplary display 780 that may be shown on the display unit 70. The display 760 may simultaneously include video images of four casino games on the same display screen. For example, the display may comprise a section 782 for playing poker, a section 784 for playing keno, and sections 786 and 788 for playing slots. The display 780 may also include a credit display section 790 and a game selection section 792. This arrangement is similar to a player playing multiple games on multiple gaming apparatuses. Playing multiple gaming apparatuses becomes increasingly difficult when the facility becomes more crowded. Additionally, many casinos do not permit players playing multiple gaming apparatuses. With the arrangement shown in FIG. 21, players can play up to four games and play them as if they were four separate gaming apparatuses. If the player wants, the games could all be the same game. Also, each of the games could be bonus games, or a special game could be developed that would use three of the sections to play for a higher level game that is displayed in the fourth section.

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A gaming apparatus, comprising:

a display support structure extending substantially vertically from a horizontal support base;

a display unit configured to generate video images and including a flat-panel display screen having a width and a height, said width of said flat-panel display screen being larger than said height of said flat-panel display screen, said width of said flat-panel display screen divided by said height of said flat-panel display screen forming an aspect ratio having a magnitude greater than or equal to 16/10, the display unit being rotatable about a horizontal axis located in a plane substantially parallel to the display screen wherein, an angle of viewing the display unit may be adjusted by vertical translation of the display unit on the display support structure, over a vertical range of motion, and by rotation of the display unit about the horizontal axis, wherein a front face of the display support structure presents, in a region proximate to the vertical range of motion, a concave side of a curved surface;

a control panel including a plurality of buttons for playing one or more wager-based games, disposed below the display unit;

a value input device;

a controller operatively coupled to said display unit and said value input device, said controller including a processor and a memory operatively coupled to said processor, said controller being programmed to enable a player to make a wager, and said controller being programmed to determine a value payout associated with an outcome of each of said wager-based games; and a display interface operatively connected to said controller and said display unit.

2. The gaming apparatus of claim 1, wherein the controller is further programmed to generate on the display unit a first video image of the one or more wager-based games at a first size on the display unit at a first time and a second video image of the one or more wager-based games at a second size at a second time.

3. The gaming apparatus of claim 1, wherein the controller is programmed to display, in response to receiving an input signal from the player, multiple instantiations of the one or more wager-based games on the display unit and to receive separate wagers on each of the multiple instantiations of the one or more wager-based games.

4. The gaming apparatus of claim 1, wherein the controller is programmed to generate on the display unit, in response to receiving an input signal from the player, different arrangements of images including game images and one or more of: pay-table images, bonus game images, input button images and game status images, wherein at least one of: a location, a size combinations of the gaming images and the one or more pay-tables images, bonus game images, input button images and game status images differs between the arrangements.

5. The gaming apparatus of claim 1 wherein the display support structure is curved and has a top end, a bottom end, and middle region, wherein the top end and the bottom end are approximately aligned with a line extending vertically from a mid point of the horizontal support base, and a rear-most part of the middle region is approximately aligned with a line extending vertically from a rear-most part of horizontal support base.

6. The gaming apparatus of claim 1 wherein the display unit is attached to the display support structure at a position below a midpoint of the height of the display support structure.

* * * * *